United States Patent
Vilandré

[11] Patent Number: 5,609,755
[45] Date of Patent: Mar. 11, 1997

[54] OIL RECOVERING APPARATUS INTEGRATED WITH TEMPERATURE CONTROLLED ELEMENTS

[76] Inventor: M. Gilles Vilandré, 1343 De La Montagne Quest,, Val-Bélair, Québec, Canada, G3K 1W2

[21] Appl. No.: 503,391

[22] Filed: Jul. 17, 1995

[51] Int. Cl.6 ................................................. E02B 15/04
[52] U.S. Cl. .................... 210/179; 210/242.3; 210/923
[58] Field of Search ................................ 210/179, 187, 210/242.3, 923

[56] References Cited

U.S. PATENT DOCUMENTS

| | | | |
|---|---|---|---|
| 3,245,539 | 4/1966 | Earle | 220/179 |
| 3,338,414 | 8/1967 | Lefke et al. | 210/923 |
| 3,358,838 | 12/1967 | Kosar et al. | 210/179 |
| 3,426,902 | 2/1969 | Kilpert et al. | 210/923 |
| 3,576,257 | 4/1971 | Yates | 210/923 |
| 3,693,805 | 9/1972 | Tillett et al. | 210/923 |
| 3,905,902 | 9/1975 | Hoegberg et al. | 210/242.3 |
| 4,978,448 | 12/1990 | Terokomos | 210/923 |
| 4,983,284 | 1/1991 | Batten | 210/187 |
| 5,173,185 | 12/1992 | Stokes | 210/242.3 |
| 5,380,431 | 1/1995 | Newsom | 210/242.3 |

Primary Examiner—Christopher Upton

[57] ABSTRACT

An apparatus that takes advantage of the adherence of hydrocarbonates to specific material and its fluidity as influenced by the temperature. The performances of the apparatus are related to the interaction of two horizontal concentric cylinders one rotating around the other and containing both collecting and recovery means, working simultaneously. A three way oil collection is achieved by the cylinder's exterior surfaces, by large conical discs and by oil scoops located between the two cylinders. Said collecting means are integrated with a central heating system and with temperature controlled recovery devices such as oil deflectors with scrapers and oil recovery reservoir with screw, so that any type of oil can be recovered efficiently from or near the water surface even in cold weather.

6 Claims, 4 Drawing Sheets

OIL RECOVERING APPARATUS INTEGRATED WITH TEMPERATURE CONTROLLED ELEMENTS

BACKGROUND OF THE INVENTION

1. Field of the Invention

An adjustable hydrocarbonates recovery apparatus, designed with collecting and recovery components, some of which are temperature controlled so that various type of oil floating on or about the water surface can be recovered, whatever their temperature.

2. Description of the Prior Art

Many attempts have been made to recover oil from spills by way of pumping the oil with pipes into reservoir after it has been contained by floating dikes. This way proves inefficient because it is very time consuming and that a too great proportion of water is gathered with the oil, and as such the problem of oil separation still remains. Our collecting system relies on the principle of the cohesivetess of oil and its adherence to certain materials from which it is recovered. In this manner very little water is collected with the recovered oil, only few droplets that sticks to oil surface are recovered with the oil.

Most patents with discs generally disclose equipment that includes small size, thin vertical discs, closely mounted near one another on a rotating shaft. These apparatus are used for small spill of light oil and in ideal temperature conditions. If the type of oil is too thick, or if it becomes too viscous on account of the temperature, the apparatus has a tendency to get clogged with oil and becomes ineffective. Contrary to these apparatus the present invention is using large size well spaced discs, few in numbers 2, 3, or 4 and having a wide thickness.

The discs are terminated in a cone shape form, their exterior walls being oblique, it providing a greater space between each disc, so that there is less danger of oil clogging between discs.

Furthermore since a certain amount of water droplets is dragged with the rotating discs as they collect oil, large size discs having a longer trajectory than smaller discs will allow more time for the water to recede off from the oil being collected. So bigger discs recover less water with oil, in proportion with smaller ones.

Most of patents that utilize conveyor belts or rollers move in a contradictory rotation. They rotate from the bottom towards the front of the device where oil is to be collected. In this manner a current is stimulated on the surface water by the belts or rollers. This current has a tendency to repel the oncoming oil and its collection becomes inefficient. In our case, the cylinder, oil scoops and disc rotate from the top, as a starting point, towards the front of apparatus and into the oil spill, where oil is collected and transferred under water toward the back all the way to the top where it is recovered. In this manner, a coming current is created on the water, which attracts the oil towards the collection devices and improves the oil collection.

Our invention utilizes a three way collecting system that works separately but simultaneously and is unique among the others. The oil collection is made first by rollers, then by oil scoops located in the interspace between the two rollers, the third oil collection is made by vertical discs wrapped around the rotating roller. This plurality of oil collection means improves the rate of oil collection in regards to other apparatus of the same size.

Unlike other patents where oil recovery is limited to oil having the desired viscosity, as determined by the type of oil involved and its temperature, our invention is equipped with recovery means that are temperature controlled, so that all types of oil can be recovered at all times. The proper fluidity necessary for oil recovery and transportation is maintained through temperature control in such components as oil deflectors with scrapers, the oil scoops between rollers and into the oil reservoir with transportation screw.

Contrary to some patents which have regulated temperature applied to collecting components, in the present invention, it is the recovery elements as named above that are temperature controlled and regulated in accordance to the temperature of collection means.

SUMMARY OF THE INVENTION

It is an object of the present invention to provide an apparatus and method for recovering oil from oil-water mixtures with heat controlled recovery elements enabling good performances in northern climate so as to overcome the disavantages of the prior art.

An ajustable oil recovery apparatus whose performance is related to the interaction of two concentric cylinders one of which contains the collecting means at surrounding temperature and rotates around the other containing the recovery means which are temperature controlled in order to reach the proper viscosity of oil necessary for its recovery.

BRIEF DESCRIPTION OF THE DRAWINGS

The FIG. 1 illustrates an isometric perspective of the apparatus on a frame and showing interior parts by mean of cut up sections.

The FIG. 2 illustrates a cross section view across the collector 4 the recovery tube 6 and discs 7.

Figure 1:
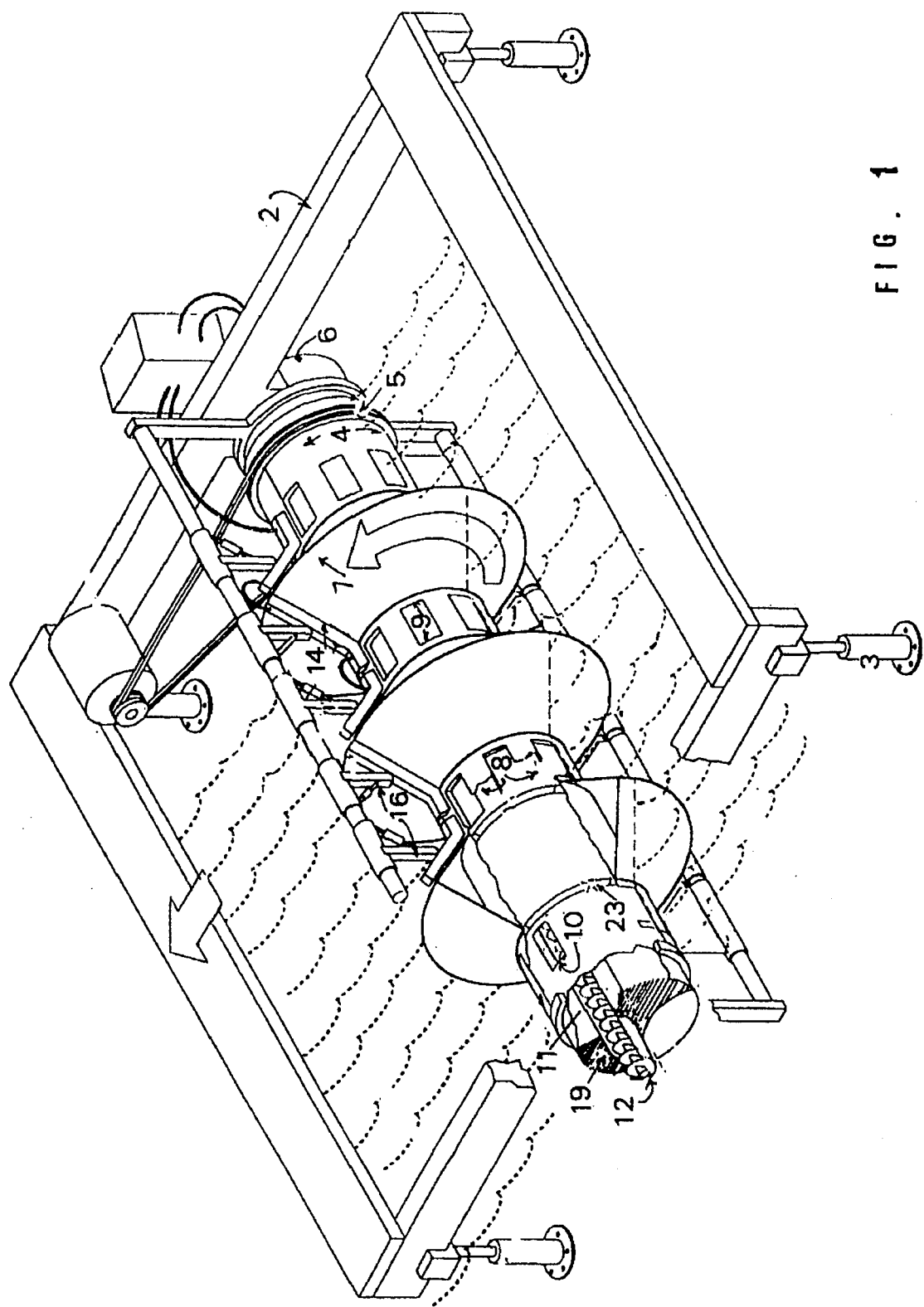
Figure 2:
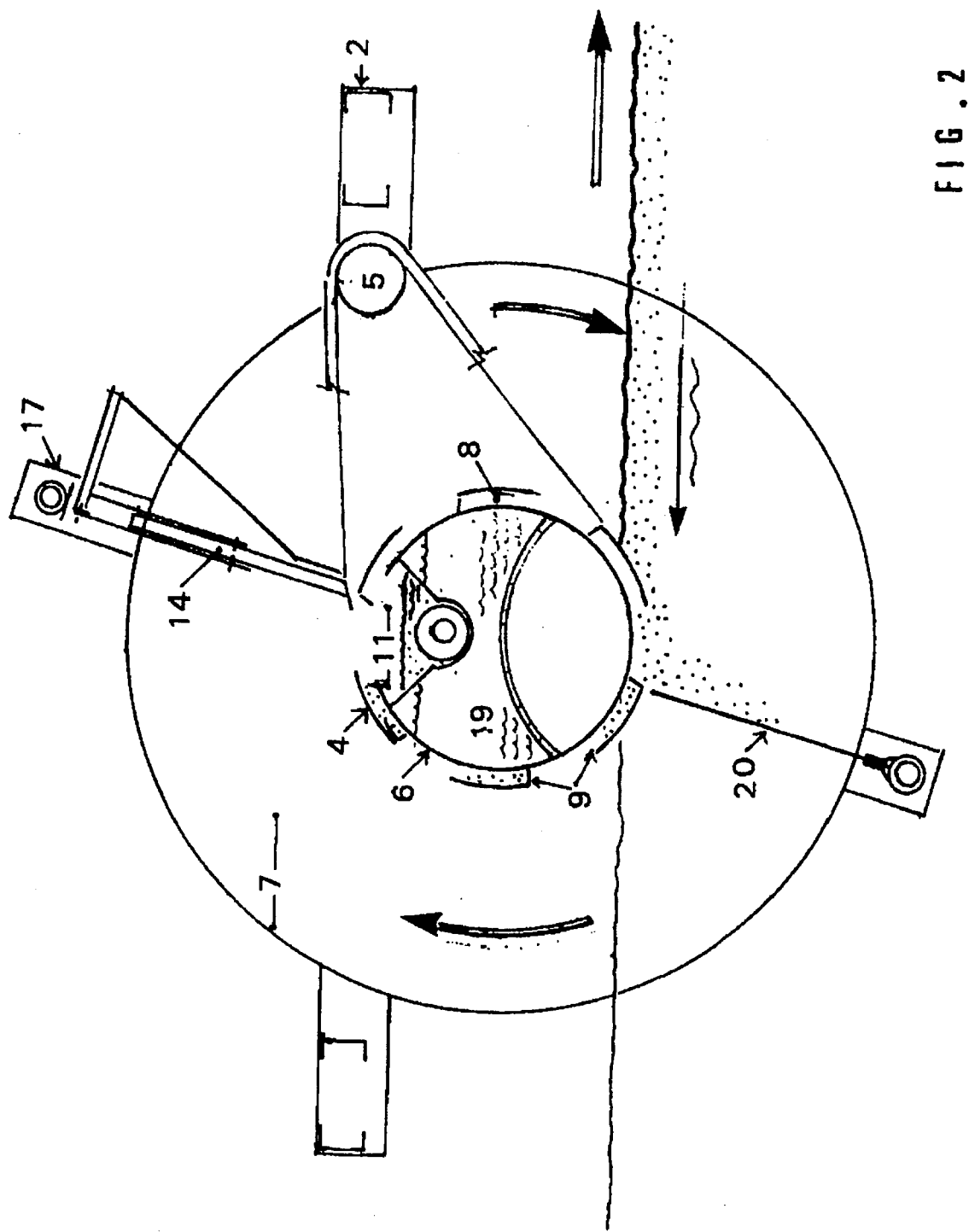
Figure 3:
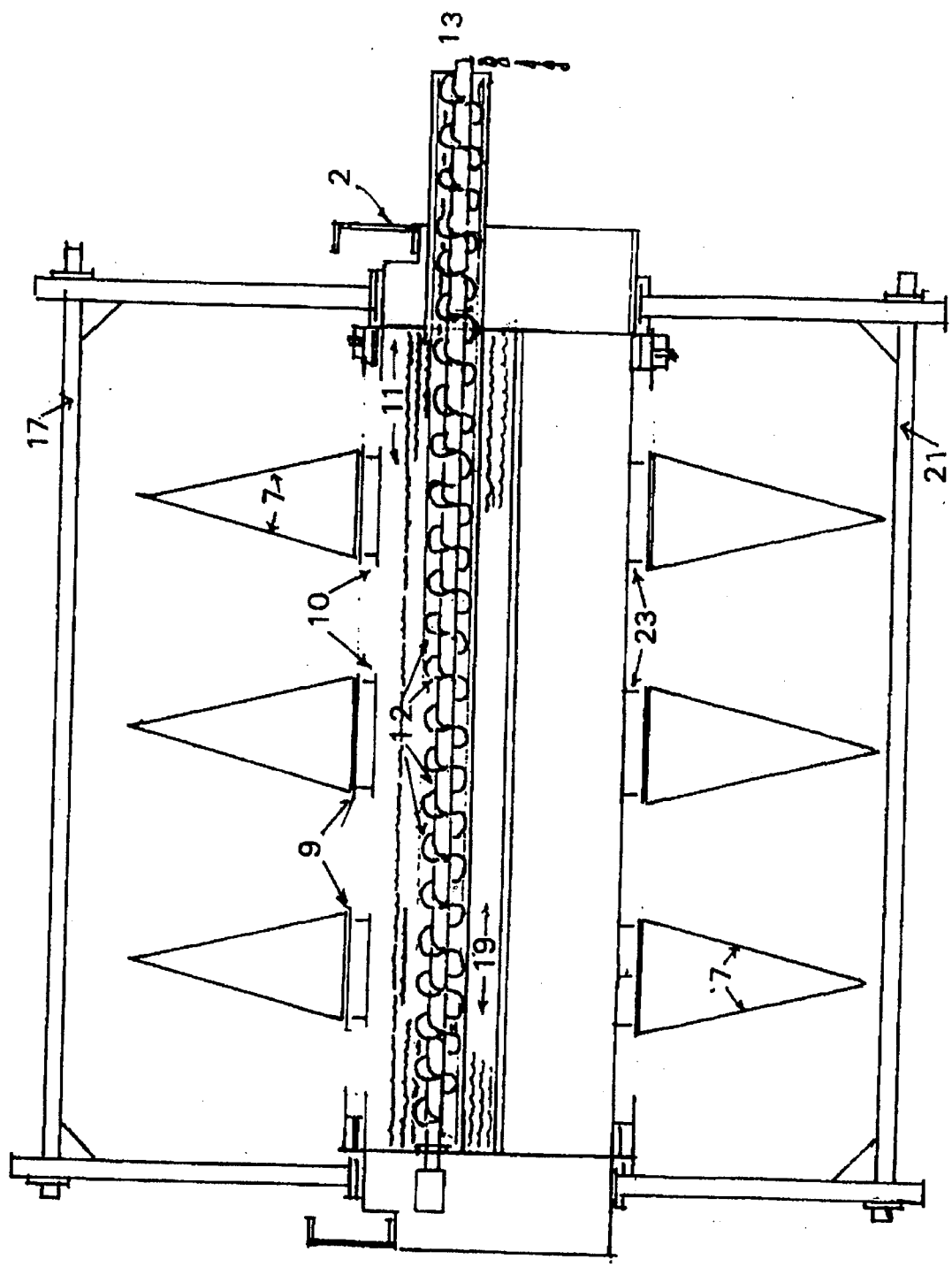

The FIG. 3 illustrates a longitudinal section view through collector 4, recovery tube 6, conic discs 7, oil scoops 8, oil reservoir 11 with screw 12 and exit 13, and heating tank 19.

Figure 4:
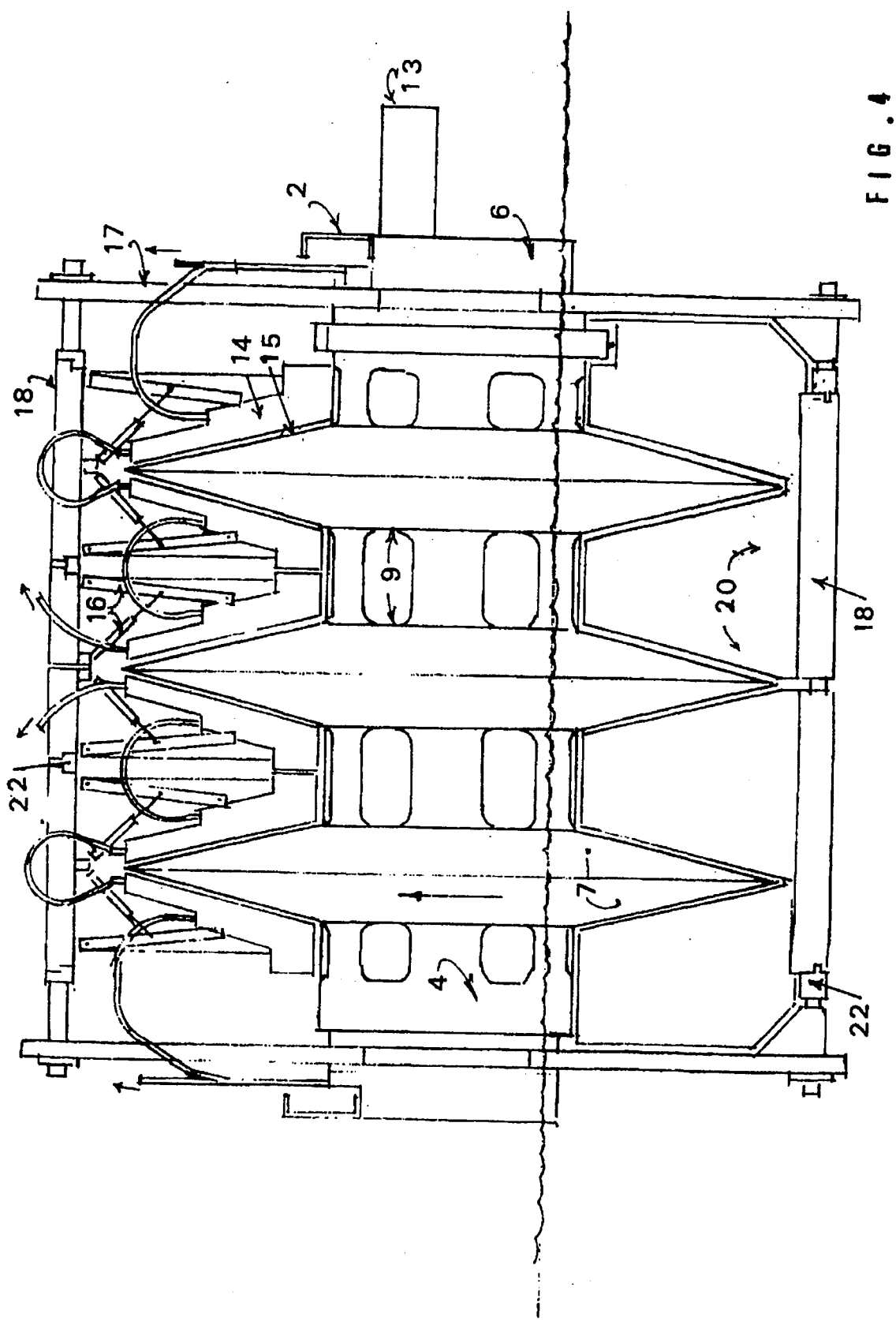

The FIG. 4 illustrates an elevation view of the apparatus as seen from the rear of the boat.

DESCRIPTION OF THE PREFERRED EMBODIMENTS

The apparatus is composed of several components built preferably of light metal like aluminum, specially made for salt water conditions, or likewise built with appropriate plastics. The components are the followings.

Collecting means: a collector 4 which is the rotative collecting cylinder that comprises a three way collecting system that is integrated in such a manner as to perform the oil collection simultaneously by way of: the exterior circumference of the collector 4 itself, a series of conic discs 7 set on the collector, oil scoops 8 contained in the inner space between the two cylinders. The collector 4 and conical discs 7 should be made of a smooth material with oleophilic properties to ensure that oil will stick on it during the collection. The oil collection coming from these three sources is distributed by way of an oil feeding system into the recovery area.

The collector 4 is a circular tube that can rotate at a desired speed around another circular tube called the recovery tube 6 which is fixed horizontally on a frame 2. The recovery tube and collector are set perpendicullar to boat direction.

In as much as this collecting cylinder rotates around the recovery cylinder, it has a slightly larger diameter than the fixed cylinder, the difference in diameter of both cylinders being represented by the thickness of reinforcing rings on both cylinders at the end of collector's cylinder added to the thickness of bearing or plastic cushion, necessary means for the rotation of one cylinder around the other. The diameter of the "collector" is subsequent to the diameter of recovery tube 6 plus the rotation cushion as described above.

The length of this cylinder can vary according to the preferred size of apparatus and the number of discs desired. The number of discs 2,3,4,5, . . . is the major factor that determines the length of the cylinder and they should be evenly distributed and secured along the length of the cylinder. Said discs are to be separated by perforated round cornered rectangular holes perforated and evenly spaced all around the contour of the cylinder. Their width is about the same as the width of conical disc. They are the oil feeders 9 and their depth is determined by the number of said feeders placed along the circumference.

The several spaces between the discs and the oil feeders 9 on the exterior perimeter of collector 4 are the collecting areas that come into play as the first collecting mean. The oil adheres to these areas when they are in contact with the spilled oil on the water surface. As the cylinder rotates in a forward direction said areas are moved around towards the rear, as far as to the top of the cylinder, where they are cleaned free of their oil content by horizontal scrapers 15 and diverted towards oil distribution system and into the recuperating reservoir.

Conical discs 7: The second collecting means is a series of conical discs 7 which are secured to the revolving cylinder 4. They are immersed at a proper height into the floating oil through the intervention of hydraulic jacks 3.

The collector 4 supporting the discs rotates around the recovery tube 6 in a forward direction from back to front of the boat. The apparatus can be adjusted to use the discs only. As the discs plunge onto the oil spill the oil adheres to their surface. The oil is carried underwater by the discs and it holds in place by the upward pressure of water on the discs. As the oil loaded disc reaches the top of its revolution, it is scraped free of its content by vertical heated deflectors 14 with scrapers 15 that send the collected oil towards the recovery means described above, to be disposed of. The discs should rotate at a variable speed which is to be synchronized with the possible rate of recovery. The rate of recovery is determined by many factors such as the thickness of the layer of oil collected on the disc's surface which is influenced by the kind of collected oil, its viscosity and its temperature. The rate of recovery is also conditioned by the capacity of the oil reservoir and the speed it is emptied by the conveying screw. Another factor to be taken in consideration is, that the speed of the rotating discs should be fast enough so as to allow the oil to remain stuck to the disc's surface until it is recovered by the deflector 14 and slow enough to permit the water droplets clinging on the oil to slip off the surface in order that the least amount of water is recovered with the oil; the rotational speed of the discs should vary from 2 to 10 rpm. All this synchronisation is done with the proper controls and the different components involved such as hydraulic motors. The speed of the monor advancing the boat is also synchronised with the speed of oil recovery.

One conical disc can be described as two vertically placed cones joined together and whose summits have been truncated. The cones are perforated so as to allow the passage of the oil collecting cylinder to which the discs are secured.

The discs are secured around the collector 4 and set perpendicularly to said rotative cylinder which while turning develops rotation of the discs. They are separated one from the other by the width of the oil feeders 9 disposed along the contour of the cylinder 4.

Said discs may be hollow or alternatively be solid suitably filled with material providing buoyancy such as polyurethane. The collecting surface of disc may be made of oleophilic substance so as to obtain good adherence qualities for oil collection. Said surface to be suitably composed of light metal such as aluminum or alloyed metal like graphite metal or plastic such as polyethylene. All of them should have a good resistance to sea water.

In order to adapt to recovery conditions, the discs have to be easily interchanged together with supporting frame 2, deflectors 14 and adjustments components. The depth of the disc's crown can be greater for rough water conditions when oil is fragmented in smaller patches but can be recovered underwater as they come in contact with proper discs. In other instances when oil has to be recovered near the shore in shallow water, it is more convenient to change to discs having a smaller diameter. The angle of the disc's cone with the horizontal should range from about 50° for shallow discs to about 75° for steeper discs.

Oil scoops 8: The third oil collecting mean is the oil scoops 8, located between the two cylinders 4 and 6. Their height is the distance separating said cylinder. The upper part of the oil scoops are the areas evenly distributed around the collector circumference, interspaced by the oil feeders which are the same dimension. The width of the scoops is limited by ring spacers 23, around the recovery tube 6. A vertical resilient scraper is attached internally to the collector, closing the rear of the scoop, while the front is open. When the collector rotates, the loads of oil are imprisoned within the scoops as they meet the oil spill at the bottom of the cylinders. These loads of oil are being heated by the walls of the heating tank as they rotate all the way around to the top of the recovery tube to oil inlet 10 and exit 13. They follow the same travelling pattern as the oil discs 7.

Recovery means:

Recovery tube 6: It is a circular tube placed horizontally inside the collector 4 and supporting all the elements of the apparatus. The recovery tube is maintained in a fixed position by the rectangular frame 2 to which it is attached; while frame is resting on four hydraulic jacks or other device, secured to the boat, that makes it possible to adjust the apparatus to a desired level. The recovery tube 6 is slightly longer than the collector 4 because of the space taken by the split ring connections around the perimeter of recovery tube at each end. The recovery tube holds the frame 17 for the deflector and the frame 21 for the baffle 20. The recovery tube comprises all the recovery means of the apparatus, it holds the heated deflector in place, and in its interior it contains other means such as the oil reservoir with screw 11, 12 and the heating system 19. The recovery tube is perforated at the summit of its perimeter by round cornered rectangular openings called oil inlets 10 which provides access to oil into its reservoir. They are placed between the discs and are the same width, but longer than the oil feeders 9 on the collector.

Oil distributing system: The oil coming from the collector and deflectors, directed towards oil inlet as described above, does not enter into the oil reservoir all at once. Since the oil feeders are interspaced by the equal areas housing the oil scoops, the oil feeding occurs only half of the time during process; that is when the oil feeders 9, on rotation, pass in front of the oil inlet 10, allowing the oil to pass through into the oil reservoir.

Deflectors 14: The deflectors are part of the recovery means. They are heated metal casing equipped with scrapers that act as stoppers for the collected oil on the disc. As the layer of oil that adheres to the disc is scraped off its surface, it is diverted towards the vertical deflector where it comes in contact with the heated metal. The oil will not stick to the metal because it attains instantly the proper lower oil viscosity permitting at the oil to flow easily down towards the oil reservoir 11 and exit 13.

The deflectors are to be made with high heat transmission metal such as copper, aluminum or otherwise composite metal. They can be made hollowed with compartments so as to allow a good circulation of heating fluids such as water or glycol, with a flat surface facing the oil with which it comes in contact. They can also be made of metal pipes with flat metal soldered on each sides.

The deflectors are equiped with scrapping blades made of hard resilient steel, that come in contact with the oil collecting surface of the discs at a slanted position allowing said blades to bend slightly as pressure is applied on them by air piston or other means during the oil scraping process, in order that the oil collecting discs are scraped clean, free of oil by the scraper's blades.

The deflectors are to be connected together with flexible hose 24 in series to form a heating circuit with circulating fluid coming from the central heating system.

Deflector frame 17 and adjustments 18: The deflector's frame is set on the periphery of the recovery tube. The two vertical members, part of supporting frame, rest on a arch forming sliding components installed at both ends of the recovery tube. The frame is adjustable and removable when needed. Being installed on the periphery of the cylinder, the frame is always oriented towards the cylinder's centre which is the important factor so that the deflectors which are supported by the frame are duly oriented to meet the tangential line of the discs also turning around the same centre.

The horizontal members of the frame are two circular pipes, one mobile tube turning around the fixed tube secured to vertical members. The deflectors secured to the outside tubing can be adjusted and locked into place by a section of tubing which is cut in a zigzag manner 22; in order for the deflectors facing the disc's surface to be scraped, and to be locked into place. They can also be turned halfway around in the opposite direction.

Wiper's arm and piston 16: The deflectors have a working process somewhat similar as the one of a windshield wiper. The deflectors are held in their mid section by a sort of vertical wiper's arm with rotating connections at both ends. Said arm is connected by a tension spring or an hydraulic or air piston which exert a tension of the deflector. This tension is transmitted as a pressure to the scrapers on the deflector. While the vertical scrapers remains stable they can clean off the oil from the turning discs.

The deflector is braced at the back by a flat metal member that forms a triangle with the top rotating connexion held by the frame, so that the deflector will not be pushed back or turned aside by the oil collecting generated pressure.

Oil reservoir 11: The oil reservoir is centered inside the recovery tube. It runs parallel to it in the form of an inverted archway, welded at the top of the cylinder. Halfway encased in the bottom of the archway is located a circular tubing which houses the screw conveyor. Oil openings are made along the top section of said tubing, in order to provide access for the collected oil in the reservoir to the screw conveyor. These oil accesses to the screw are about twice as wide as oil feeders, the length of the reservoir being the same as the length of the collector. The oil inlets 10 located between the discs are perforated at the top centre of recovery tube. These accesses to the oil reservoir are of rectangular round cornered dimensions. The oil exit 13 which is above water level is at the end of screw 12. The collected oil coming out is already heated to a desired temperature and can easily be transferred to other disposal means.

Heating system 19: The heating system 19 that comprises a hot water or glycol reservoir is located inside the recovery tube just underneath the oil reservoir. Its length is the same as the oil reservoir and the collector's length. The lower wall of the reservoir is an half rounded archway whose base is connected on each side on the lower section of the recuperator. The upper wall of the reservoir is a part of the external surface of the recovery tube itself. Since the reservoir is longitudinal, long electrical heating elements combined with pumps are to be placed at each ends, in order to obtain evenly heated liquid all through the reservoir. The temperature is controlled with a thermostat to maintain a proper temperature and to ensure that the temperature will not raise over the security limit of the apparatus. A security limit of 75° C. is sufficient to obtain the proper fluidity even for V code oil in cold water as low as 4° C. Electrical power for the heating system can be provided with a seaworthy diesel generator, another source being heated fluids produced by the boat's motors.

The underside of the reservoir is to be insulated and also areas of the exterior perimeter of the recovery tube between the oil scoops. The three recovery means are to be heated simultaneously by the heating system 19 to a desired degree of temperature in order that cold and very viscous oil can be recovered, namely the deflectors 14 with scrapers 15 the oil reservoir 11 with screw 12 and as well as the oil scoops 8. At the exit 13 oil will be at a maximum temperature of 70° C. in some instances. At this temperature the oil can easily be transferred and transported by other recovery means even in cold weather.

Baffle 20: They are metal stoppers installed vertically underneath the oil recovering apparatus, at the mid section of circular collector. They follow the contour made by the collector and conic discs, leaving a small margin between each part. They are secured to a tubular member 18 on the baffle's support 21, and held in place by a locking device 22 when facing the water's current, but allowing the baffle to turn in opposite direction, if needed. The baffle support 21 is secured at the perimeter of the recuperator's ends by an adjustable split ring connexion.

Other parts of the apparatus are: The hydraulic jack 3, connected to the supporting frame 2, so that the height of the recovery apparatus in relation with the water level and the oil slick, at lower position 25, can properly be adjusted for oil recovery and raised from water at a position 26 above water level, when travelling between spills to boat's base, the oil baffles 20 with adjustment parts so as to keep oil from bypassing the apparatus and also to stop unwanted particles of objects from entering into the apparatus. Also needed are the drive means to rotate the "collector" 4 around the recovery tube 6. A motor is to be installed at one end of screw to generate its rotation which should be synchronized with speed of collector and oil recovery.

The embodiments of the invention in which an exclusive property or privilege are claimed, are defined as follows.

What is claimed is:

1. An oil skimming apparatus for the recovery of hydrocarbons floating on or within the surface of water comprising:

an outer collecting cylinder having collection means and means for rotating said outer cylinder around a concentric inner fixed recovery cylinder having oil recovery means;

said collecting means comprising rotating oleophilic conic discs for collecting oil from the water, oil feeders on the surface of said outer cylinder communicating with a space between said cylinders, and oil scoops connected to the inside of the outer cylinder within said space between said cylinders;

oil distribution means for directing oil into the oil recovery means; and temperature control means comprising a central heated reservoir within said recovery cylinder to maintain the fluidity of oil in transit.

2. The apparus of claim 1 wherein the oil scoops comprises ring spacers and vertical scrapers connected to the collecting cylinder forming an ensemble of rotative collecting scoops, that can transport oil in between the two cylinders to the top of inner cylinder, where it is released into the oil distribution means.

3. The apparatus of claim 1 wherein said oil distribution system comprises a series of evenly distributed openings at the top of said recovery cylinder, and said oil feeders comprise openings around the perimeter of the rotating cylinder between the disks.

4. The apparatus of claim 1 wherein the recovery means comprises an oil recovery reservoir placed horizontally for the full length of the collecting cylinder and located inside and at the top section of the inner fixed cylinder, a screw for conveying oil which is placed at the bottom of the full length of said reservoir which screw is extended outside of the cylinders on one side and above water level, and wherein said oil distribution means comprises perforations made in the upper section of the recovery reservoir.

5. The apparatus of claim 1 further comprising a series of deflectors held on an adjustable frame secured on the perimeter of the collecting cylinder, said deflector being placed vertically and having means for adjustment backward and forward and sideways so that they can be set at the proper fixed position to scrape the oil completely off from the conic discs, and scrapers comprising metal resilient strips connected to the deflectors that are placed at an inclined angle with the disks, and means for applying pressure between said scrapers and said disks, so that a pressured contact can be maintained between scrapers and discs surface, enabling oil removal and transfer to the deflector's surface and into the oil distributing means.

6. The apparatus of claim 5 wherein the oil deflectors further comprise means for circulating temperature controlled fluid provided by said central heated reservoir through said deflecting, so that the collected oil from the scraped surface of discs will fall off the heated surface of said deflectors.

* * * * *